Aug. 21, 1923.
J. H. C. DE BREY
1,465,598
PROCESS FOR THE TREATING OF HYDROCARBONS
Filed June 1, 1918
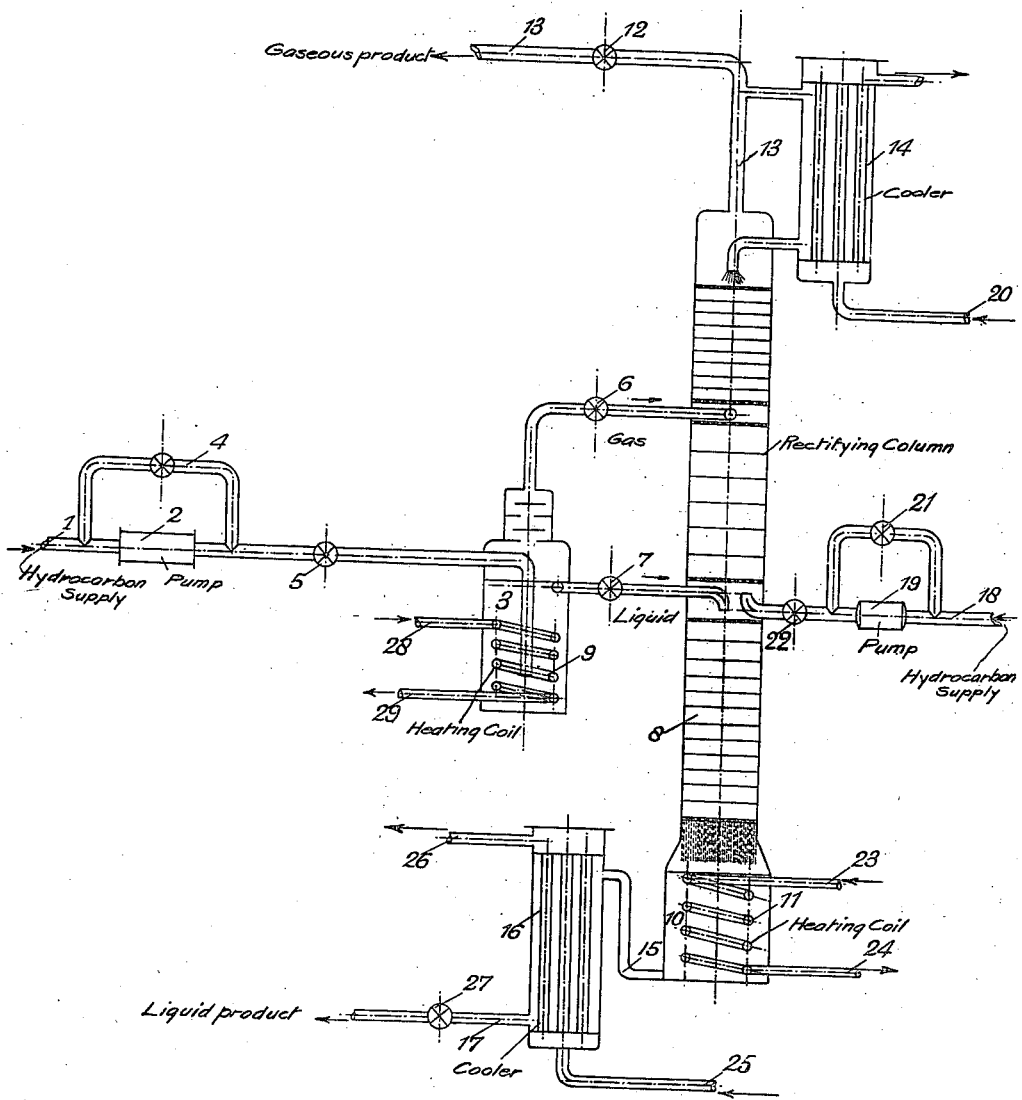

Patented Aug. 21, 1923.

1,465,598

UNITED STATES PATENT OFFICE.

JAN HEINRICH CHRISTOPH DE BREY, OF THE HAGUE, NETHERLANDS.

PROCESS FOR THE TREATING OF HYDROCARBONS.

Application filed June 1, 1918. Serial No. 237,801.

*To all whom it may concern:*

Be it known that I, JAN HEINRICH CHRISTOPH DE BREY, subject of the Queen of the Netherlands, residing at The Hague, Kingdom of the Netherlands, have invented certain new and useful Improvements in Processes for the Treating of Hydrocarbons, of which the following is a specification.

The object of my invention consists of a process for treating, for example, decomposing into two parts mixtures of hydrocarbons which volatilize at different temperatures, and which contain highly volatile fractions either in a purely vaporous form or both in a liquid and vaporous form together or which may even contain gases, the two components being viz. a liquid and a gaseous, the liquid component being obtained practically free from those volatile fractions or gases, whose recovery in a liquid state is not intended, and whereby the gaseous component is obtained practically free from those fractions of minor volatility which for the purpose of the present invention should be recovered in liquefied form.

In my specification I will designate hereafter those fractions of minor volatility, which according to my present invention should be recovered in liquid state, as valuable fractions and those very volatile components, which in the original mixture of hydrocarbons were present either in vaporous or in liquid form and further the gases which were in solution in the said mixture and the recovery of which in liquefied form is of no value for the purpose of my invention, will be designated as worthless fractions.

Examples of mixtures of hydrocarbons which can be treated by the process of my present invention and which contain the said valuable and worthless fractions or constituents intermixed with each other, are "lean" gases, casinghead gases containing gasoline, and stillgases which are developed during and by the distillation of crude petroleum or similar bodies, as for example bituminous shale and the like.

The term "stillgases" is to be understood as including those fractions of great volatility, and gases such as are present in the crude petroleum, which volatilize during the distillation, remaining in gaseous form during and after the subsequent condensation, and which, enriched with valuable fractions, escape in gaseous form, owing to the fact that by application of processes used hitherto these gases cannot be recovered or brought into liquid form. The said processes used hitherto, are condensation, treatment of the gaseous substances containing the said valuable components in the scrubber and the like.

Other mixtures of hydrocarbons which may be treated according to my present invention with a view to the recovery of all the valuable fractions and constituents from the worthless fractions and vice-versa, that is, to separate the worthless fractions from the valuable fractions, are all mixtures of hydrocarbons such as are obtained as by-products during and as a result of the manufacture of illuminating gases, by the production of cokes and similar industrial applications or processes as, for example, oil cracking processes and the like.

The purpose of my present invention consists of a method by which the decomposition of the mixture of liquid hydrocarbons into the components is effected in such way that all valuable fractions are excluded from the gaseous component and that the valuable fractions are obtained freed from all worthless and detrimental constituents, and for obtaining a marketable product.

The characteristic features of my invention are:

That contrary to the methods applied hitherto for obtaining marketable products from mixtures of hydrocarbons of different volatility, containing highly volatile fractions (for example casinghead gasoline), the mixtures are separated into two distinct components, namely a valuable and a worthless one, that is, I obtain one component which contains mainly valuable fractions and the second one, which consists mainly of worthless fractions.

In the specification relating to my application Serial No. 237,802, filed June 1, 1918, I set forth, that the said purpose is attained by rectifying the mixtures of hydrocarbons at high pressure, at or in excess of 20 atmospheres.

This said purpose is according to my present invention attained by carrying out the process of rectification at a pressure not surpassing a certain and predetermined maximum and at a suitable low temperature.

According to my present invention rectification is carried out by keeping the lower limit of temperature used during the process of rectification, corresponding to the variable pressure, sufficiently low as to attain a suitable condensation of the worthless fractions at that phase of the process at which the last traces of the valuable fractions must be washed out of the gaseous component by the condensed worthless fractions or a suitable part thereof.

This indicates the minimum temperature which should be used whilst carrying out the rectification, and which minimum temperature is determined by the temperature of condensation of the worthless fractions or of a corresponding part of same at that pressure at which the process of rectification is being effected.

The maximum temperature to be used and up to which the liquid fractions to be treated should be heated, is determined and characterized by the limit at which, by the pressure employed, the worthless fractions are expelled entirely or at least to a suitable extent from the said liquid fractions.

From the foregoing it results that there exists between the temperatures used and the pressure employed a certain relation, which can be characterized, namely that the height of pressure used depends upon the limits of the temperature employed and that the pressure thus constitutes a mathematic function of the limits of temperature used.

In carrying out the rectification of the mixture of hydrocarbons to be decomposed, the maximum limit of the pressures employed lies below 20 atmospheres, whilst the minimum pressure is one atmosphere.

The extent of the pressure employed will also depend on the one hand upon the physical properties of the mixtures of hydrocarbons to be treated, and on the other hand upon the temperatures of the cooling bodies or cooling means employed by or present during the carrying out of the process.

The lower temperatures required for carrying out the process can be attained:

(a) By direct cooling, which can be obtained, for example by water cooling or by cold produced artificially or in any other suitable way;

(b) By causing the mixtures of hydrocarbons to be rectified, to expand;

(c) By submitting the mixtures of hydrocarbons to be treated to a combined action, that is, cooling, prior to or after allowing the said mixtures of hydrocarbons to expand or during the said expansion.

In some cases a suitably small compression will in itself be sufficient to carry out the process.

A second characteristic feature of my invention consists in the following:

The separation of the valuable and worthless fractions from each other which is required for carrying out the process of rectification, can be accelerated, facilitated and rendered more effective by submitting the mixtures of hydrocarbons, to be treated to a preliminary treatment.

The purpose of the said preliminary treatment consists in separating the mixture of hydrocarbons into two components in such a way as to bring the liquid and gaseous fractions into such relationship to each other as to ensure the most favorable technical conditions for carrying out the rectification process.

This preliminary treatment consists in submitting the mixtures of hydrocarbons which are to be rectified subsequently, to the pressure at which the subsequent rectification is carried out and at such a temperature as to ensure the most favorable relationship between gaseous and liquid components for carrying out the rectification process.

The pressure used in the said preliminary treatment must be at least as great as the one employed during the subsequent rectification process, but may also be higher, whilst the temperature which depends, as already mentioned, during this preliminary treatment upon the physical properties, for example, upon the chemical composition, of the mixture of hydrocarbons to be treated, must be lower than the maximum temperature used for carrying out the subsequent process of rectification.

The following is an example for carrying my invention into practice:

The mixtures of highly volatile hydrocarbons to be rectified according to my process, are brought in suitable vessels where they are subjected to the rectification at a pressure, the maximum limit of which is below 20 atmospheres, whilst the minimum pressure is one atmosphere.

The limits of temperature to be used in connection with the different degrees of pressure above mentioned can be selected in such a way as to cause with the aid of the pressure present in the vessel, on the one hand the elimination of the worthless fractions from the liquid component, and on the other hand the removal or washing out of the last traces of valuable fractions from the gaseous component, this being effected by means of the condensed worthless fractions or of a suitable part of same.

The limits of temperature used in connection herewith depending, as already pointed out, upon the physical properties of the hydrocarbons to be treated, range between two limits, for example, for compressor gasoline under a pressure of about 5 atmospheres between a maximum temperature of about plus 80° C. and a minimum temperature of about minus 5° C.

From the two components, the worthless one, after having undergone the above treatment, is freed of all valuable fractions and may now either be allowed to escape or to be used for any required technical purpose, whilst the liquid component is retained as a marketable product containing the highest possible amount of valuable fractions, thereby approaching the theoretical maximum.

As already mentioned, the process of rectification can be improved and rendered more effective by subjecting the mixture of hydrocarbons, prior to submitting the same to rectification, to a preliminary treatment for the purpose above indicated, in order to separate and transform the liquid and gaseous components into a certain relationship, by which the rectification process is rendered most advantageous.

For this purpose, according to the said preliminary treatment, the mixture of hydrocarbons is submitted in suitable vessels to a pressure which is at least equal to or greater than the pressure employed in carrying out the rectification whilst the temperature employed is, as already indicated, lower than the maximum temperature used for the purpose of carrying out the rectification. Thus in the example given above, the pressure to be used may be 5 atmospheres or more, but must be less than 20 atmospheres, whilst the temperature used may be raised to about plus 50° C.

From the vessel in which the said preliminary treatment has been effected, the two components are now conducted to the vessels employed for effecting the rectification.

Both the rectification process and the preliminary treatment may be carried out either continuously or periodically.

The accompanying drawing shows a sectional view of one form of apparatus suitable for carrying out the invention.

In the arrangement shown, the casing head gasoline is supplied by tube 1 to the pump 2 and is forced into the reservoir 3, wherein a pressure of less than 20 atmospheres is maintained.

The supply of casinghead gasoline is regulated by a by-pass regulating valve 4, connected with the pump 2, and the internal pressure in the reservoir 3 is regulated and adjusted by means of three regulating valves 5, 6, 7.

The casinghead-gasoline in the reservoir 3 is heated to about 50° C., by means of a heating coil 9, having a steam inlet 28 and an outlet 29, in the preliminary treatment hereinbefore mentioned.

As a result of this preheating, one part of the casinghead-gasoline will be volatilized whilst another part of same remains liquid.

Both the liquid part and the volatilized compounds are conducted into a high pressure rectifying column 8; the gaseous fractions are introduced into the upper part, and the liquid components into the lower part of the column, according to the worthless fractions contained in the said two parts.

In the high pressure rectifying column 8, there exists an internal pressure of 5 atmospheres and the vapours rising in this column, meet with a stream of condensed light fractions, running back from a cooler 14, having a water inlet 20, into the rectifying column 8.

At the bottom 10 of the rectifying column 8 the heaviest components are collected in liquid state, and under the action of a heating coil 11 having a steam inlet 23 and outlet 24 are therein heated to about 80° C. for the purpose of expelling the last traces of the worthless fractions.

After the state of equilibrium has been attained and after all the regulating valves have been brought into working position, the apparatus will work continuously.

From the top of the column 8 a stream of gases escapes through tube 13 and regulating valve 12, consisting exclusively of worthless fractions, the last traces of valuable fractions having been washed out by the condensate coming from the cooler 14; and from the bottom of the column 8 a stream of liquid gasoline is conducted away at 15, through cooler 16 and tube 17, consisting exclusively of valuable fractions, entirely or nearly entirely freed from gas and light fractions, which liquid forms an immediately marketable product, free from all the detrimental properties of the "raw casinghead-gasoline," as for example high vapour-pressure and the like. The cooler 16 has water inlets and outlets 25, 26 respectively and tube 17 has a valve 27.

The above description refers to the treatment of mixtures of hydrocarbons in the liquid state.

The said mixtures occur however also in gaseous condition as for example in refineries, where still gases are obtained as a secondary constituent.

In such cases the mixture is not introduced into the system (8, 3) through tube 1, but through the tube 18, and by the aid of a compressor 19 it is forced into the column 8 under a pressure of 5 atmospheres. A by-pass valve 21 is arranged for the compressor and a regulating valve 22 is provided between the compressor 19 and column 8. If at the said compression of 5 atmospheres the said gases are liquefied, the liquid obtained may be carried to the reservoir 3 and then submitted to the further preliminary treatment as above described.

The introduction of the hydrocarbon mixtures through tubes 1 and 18 may take place simultaneously or in other words, if found suitable in the industrial application both liquid and gaseous mixtures may be subjected simultaneously to the aforesaid treatment.

I claim:

1. The process of treating mixtures of hydrocarbons containing a valuable liquid and a worthless gaseous component which comprises rectifying the mixture at a low temperature and at a superatmospheric pressure less than 20 atmospheres and correlating the pressure and the temperature range of rectification in such manner that the maximum temperature is sufficient to expel all the worthless component from the valuable component while the minimum temperature is sufficient to condense a portion of the worthless component whereby the last fractions of valuable component are washed out of the gaseous worthless component by the liquefied worthless portion thus condensed.

2. In the process of rectifying hydrocarbons containing a valuable liquid and a worthless gaseous component at superatmospheric pressures less than 20 atmo., washing out the last traces of valuable component from the gaseous worthless component by liquid worthless component which is returned to the sphere of rectification.

3. A process as claimed in claim 1 in which casing head gasoline is treated.

4. A process as claimed in claim 2 in which casing head gasoline is treated.

5. Process for splitting mixtures of hydrocarbons of different volatility into two components, namely, into a valuable liquid component practically free from gases, the recovery of which in liquid state is not wanted, and into a gaseous component practically free from those fractions of minor volatility which are to be recovered in liquid state, which process consists in subjecting the mixtures of hydrocarbons to rectification at such pressure and within such corresponding limits of temperature, that the most volatile components during the whole process of rectification are kept partly in gaseous and partly in liquid state.

6. Process according to claim 5 and which consists in the application of a preliminary treatment for forming a liquid phase and gaseous phase in the mixture of hydrocarbons to be subjected to rectification, the said phases being produced in such relation as is most suitable for carrying through the process of rectification, the said preliminary treatment consisting in subjecting the mixture to a pressure equal to or higher than the pressure applied in the rectification process, and at temperatures which are below the highest temperature applied during the process of rectification.

7. Process for treating mixtures of hydrocarbons of different volatility, consisting in the separation of the said mixtures of hydrocarbons into two components, a valuable liquid one, practically free from volatile fractions or gases, the recovery of which in liquid form is not required, and a gaseous one, practically free from all valuable fractions by subjecting the mixture of hydrocarbons to rectification at high pressure not exceeding a maximum of 20 atmospheres and at low temperatures.

8. Process as claimed in claim 5 in which the worthless fractions are condensed and the condensate contacted with the gaseous component whereby the valuable fractions are washed out of said gaseous component.

9. Process as claimed in claim 1, in which the low temperatures necessary for rectification are produced by the expansion of the compressed hydrocarbon-mixture.

10. Process as claimed in claim 1, in which the low temperatures necessary for rectification is produced by the combined action of the expansion of the compressed hydrocarbon-mixture and a cooling agent.

11. Process as claimed in claim 1, in which the hydrocarbon mixtures are separated into valuable and worthless components consisting in subjecting the same to a preliminary compression and thereafter rectifying at a pressure below 20 atmospheres and at temperatures of from −5 to 80° C.

12. Process as claimed in claim 1, in which the hydrocarbon mixtures are separated into valuable and worthless components, consisting in rectifying the same under a pressure of 5 atmospheres and at a maximum temperature of 80° C. and a minimum temperature of −5° C.

13. Process as claimed in claim 1, in which the hydrocarbon mixtures are separated into valuable and worthless components, consisting in subjecting the same to a preliminary compression at a pressure of 5 atmospheres and a temperature of 50° C. and then rectifying.

14. Process of rectifying mixtures of hydrocarbons of different volatility which comprises subjecting the mixture of hydrocarbons to preliminary treatment under heat and pressure whereby a liquid component and a gaseous component are formed, delivering said components separately at different points into a rectifying column, the gaseous component being introduced into said column above the point of delivery of the liquid component, subjecting said components in said column to a maximum temperature higher than the temperature employed in the preliminary treatment under pressure greater than the pressure employed in the preliminary treatment, heating the liquid collected in the bottom of the column to the maximum temperature employed in the column whereby said liquid is freed from gaseous component, and condensing a portion of the gas passing from the upper end of said column and showering the condensate into said column whereby the gas in the upper end of said column is freed from liquid component.

In testimony whereof I have affixed signature in presence of two witnesses.

JAN HEINRICH CHRISTOPH de BREY.

Witnesses:
T. A. VELEVEN,
CHWANN BERGS.